United States Patent
Shetty et al.

(10) Patent No.: US 8,180,381 B1
(45) Date of Patent: May 15, 2012

(54) METHOD AND SYSTEM FOR REDUCING PAGING CHANNEL TRAFFIC

(75) Inventors: Manoj Shetty, Overland Park, KS (US); Sachin Vargantwar, Overland Park, KS (US); Bhagwan Khanka, Lenexa, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 306 days.

(21) Appl. No.: 12/612,202

(22) Filed: Nov. 4, 2009

(51) Int. Cl.
*H04W 4/00* (2009.01)
*H04W 68/00* (2009.01)
*H04B 7/00* (2006.01)
*H04B 1/38* (2006.01)
*H04M 1/00* (2006.01)

(52) U.S. Cl. ............... 455/458; 455/435.1; 455/515; 455/560; 455/567; 379/69; 379/84

(58) Field of Classification Search ............... 455/432.3, 455/434, 435.1, 458, 511, 515, 560, 567; 379/69, 84; 370/310, 328, 329, 338
See application file for complete search history.

(56) References Cited

U.S. PATENT DOCUMENTS

| | | | | |
|---|---|---|---|---|
| 4,775,999 | A * | 10/1988 | Williams | 455/435.1 |
| 5,588,043 | A * | 12/1996 | Tiedemann et al. | 455/435.1 |
| 7,283,819 | B2 * | 10/2007 | Jiao et al. | 455/435.1 |
| 7,941,175 | B1 * | 5/2011 | Hoff et al. | 455/527 |
| 2002/0090960 | A1 * | 7/2002 | Laroia et al. | 455/458 |
| 2003/0008657 | A1 * | 1/2003 | Rosen et al. | 455/452 |
| 2007/0253399 | A1 * | 11/2007 | Deshpande et al. | 370/347 |
| 2008/0304434 | A1 * | 12/2008 | Giaretta et al. | 370/313 |
| 2011/0165894 | A1 * | 7/2011 | Willey | 455/458 |

* cited by examiner

*Primary Examiner* — Wesley Kim (57) ABSTRACT

A method and system for reducing an amount of traffic on a paging channel of a wireless communications system by holding a pending page message until a subsequent re-registration request and response cycle scheduled to occur within a threshold amount of time. A radio access network (RAN) may be configured to determine whether an amount of time to a next scheduled re-registration request and response cycle is less than a threshold amount. If the amount of time is less than the threshold amount, the RAN may delay transmission of the pending page message until the next re-registration request and response cycle. By sending the pending page message in a response to a scheduled re-registration request, or by sending the pending page as the response to a received re-registration request, the amount of traffic on the paging channel of the wireless communications system may be reduced.

15 Claims, 5 Drawing Sheets

METHOD AND SYSTEM FOR REDUCING PAGING CHANNEL TRAFFIC

BACKGROUND

It is generally known for a cellular wireless communication device (WCD) to engage in voice calls via a cellular radio access network (RAN). A traditional RAN includes one or more mobile switching centers (MSCs), each of which is connected with one or more base station controllers (BSCs), and each BSC is in turn connected with one or more base transceiver stations (BTSs) that define cellular wireless coverage areas in which wireless communication devices can operate.

Typically, each BTS includes an antenna tower with antennas arranged to radiate in a desired pattern so as to produce a desired level of coverage, defining a cell and a number of cell sectors. Each BSC then functions to manage air interface communications, such as to assign air interface traffic channels over which WCDs can communicate, and to manage handoff of communications as a WCD moves between coverage areas (e.g., sectors). Each MSC, in turn, functions as a switching point, to provide connectivity between various WCDs in its coverage, and between WCDs and the public switched telephone network, and further to facilitate handoff of communications as a WCD moves between BSC serving areas or MSC serving areas.

Conventionally, each WCD has an assigned identifier, such as a mobile identification number (MIN) or mobile directory number (MDN), that the RAN may use to identify and track the WCD.

When a WCD powers on in, or otherwise enters, a coverage area (such as an area served by a particular BTS, BSC, or MSC), the WCD may register with the RAN, so the RAN can know where the WCD is located (e.g., for purposes of directing calls to the WCD) and so the RAN can verify that the WCD is authorized to engage in wireless communications. In a typical radio network registration process, the WCD sends a radio access registration message over the air to the RAN via an access channel and, assuming a successful registration, the RAN then sends a radio access registration acknowledgment message to the WCD via a paging channel.

For example, in a system compliant with the well known CDMA (e.g., CDMA2000®) and IS-41 protocols, a WCD engages in radio network registration by sending over the air (via the access channel) to the BTS and, in turn to the BSC, an "access probe," which carries an identifier of the WCD (such as its MIN or MDN) and other pertinent information. When the BSC receives the access probe, the BSC passes the access probe along to the MSC, and the MSC then sends an IS-41 "Registration Notification" message to a home location register (HLR).

The HLR stores a service profile for each WCD that is authorized to operate in the RAN. Each MSC is coupled with an HLR, typically by an out of band signaling network. Besides authorizing service, the HLR service profile may also be used to store and thereby track location information reflecting a current location in a wireless service provider's network of each authorized WCD.

When a registration notification message is received by the HLR, the HLR updates the WCD's profile to indicate where the WCD is operating (e.g., which MSC is serving the WCD) and may further carry out an authentication process. The HLR may then send an IS-41 registration notification return result, typically including the WCD's service profile, to the corresponding serving MSC. The serving MSC may then store the profile in a local visitor location register (VLR) and send a registration acknowledgement over the air (in an air interface paging channel) to the WCD to complete the registration process.

In order to avoid a buildup of profiles at the MSC, WCDs served by the RAN may be required to re-register with the RAN at a re-registration interval. The re-registration interval may be used to determine whether WCDs currently being served by the RAN have either left the service area of the RAN or have powered off. Once a RAN establishes a re-registration interval and informs WCDs operating within its service area of the interval, it may unload profiles of WCDs that fail to re-register within that interval. For example, if a re-registration interval assigned to a particular WCD passes without the WCD sending a re-registration request, the MSC may assume that the WCD has left the service area or powered-off, and the MSC may unload the profile associated with the WCD, thereby freeing resources in the RAN to serve new WCDs that have entered the service area or powered on.

The RAN may notify each WCD it is serving of an assigned re-registration interval by including the assigned re-registration interval within a registration acknowledgment message or in a separate message. For example, a re-registration interval message solely directed to transmitting the assigned re-registration interval to the WCD could be sent at some point after sending the registration acknowledgment message. In the latter case, the re-registration interval may be measured either from receipt of the initial registration acknowledgment message or from receipt of the re-registration interval message.

The re-registration interval assigned to WCDs operating within the service area of the RAN may be fixed and may be determined by an operator of the RAN, or may vary dependent upon other variables, such as system load or time of day. For example, the re-registration interval may be twenty minutes during the day and forty minutes during the night. In such a case, and in order to remain registered with the RAN, a WCD assigned the re-registration value of twenty minutes during the day may send a re-registration request to the RAN within the allotted twenty minute interval in order to ensure continued wireless service from the RAN.

Once the WCD is registered with the RAN, the WCD can then place and receive voice calls (assuming the WCD's service profile and configuration allow it). To place a call, for instance, the WCD may send a call origination message over the air (in the air interface access channel) to the RAN, providing a set of dialed digits indicative of a called party phone number. Upon receipt of the call origination message, the MSC may then direct the BSC to assign an air interface traffic channel for use by the WCD, and the MSC may further engage in call setup signaling to set up the call with a remote switch serving the called party. When the called party answers, the MSC may then connect the call through to the WCD.

On the other hand, when the MSC receives a request to connect an incoming voice call or data connection to the WCD, the MSC may page and alert the WCD over the air (in the air interface paging channel). The WCD may acknowledge the page by sending a page response to the RAN (e.g., responsive to a user pressing the "talk" button). The page response message may take various forms. After receiving the page response message, the MSC may then connect the voice call or data connection through to the WCD.

There are typically several paging channels available for a RAN to use in alerting WCDs operating in its service area of incoming voice or data connections. While several paging channels are typically available, the total number of paging channels over which a RAN (in particular, a BTS) may transmit paging messages to WCDs operating within its service area is normally set to a hard limit based on the amount of resources implemented by an owner of the RAN. For example, each BTS may have available up to seven paging channels over which to send page messages to served WCDs.

Each available paging channel may be divided into a number of timeslots during which a base station can transmit a page message to a WCD. In order to conserve battery power, each WCD is then typically arranged to operate at a given "slot cycle index" (SCI), which defines the frequency or period at which the WCD will wake up and check the paging channel for any outstanding pages. For instance, under CDMA2000, a WCD operating at a slot cycle index of 0 (zero) would wake up and check for a page every 1.28 seconds, whereas a WCD operating at slot cycle index 2 would wake up and check for a page every 5.12 seconds.

In light of the foregoing, there is an upper limit of paging channel traffic supported by the RAN. Because each transmission on the paging channel from the BTS to a WCD operating within the service area of the RAN must be assigned a particular timeslot on one of a limited number of paging channels, it is possible that the number of pending messages to be sent across the paging channels becomes greater than the number of available time slots available over the paging channels. In such a situation, pending page messages may become substantially delayed or even dropped. To a user of a WCD in the service area of the RAN and who is unaware of paging channel capacity issues, the substantial delay and/or dropping of page messages may cause user dissatisfaction with network performance and may cause device responsiveness to suffer.

Overview

The present disclosure relates to wireless communications and, more particularly, to cellular wireless communications that can be usefully employed to reduce an amount of traffic required to be sent on paging channels of a wireless communications system per WCD. Traffic on the paging channels may be reduced by holding a pending page message until a subsequent re-registration request and response cycle if the subsequent re-registration request and response cycle is scheduled to occur within a threshold amount of time.

According to an exemplary embodiment, a RAN may detect a page message destined to a WCD. Responsive to detecting the page message, the RAN may determine an amount of time remaining in a re-registration interval associated with the WCD to which the page is directed. If the determined amount of time remaining is less than a pre-determined threshold level, then the RAN may delay transmission of the pending page message to the WCD until after the RAN receives a re-registration request from the WCD. Once the re-registration request is actually received by the RAN within the re-registration interval, the RAN may then generate a registration acknowledgment message in response to the received re-registration message and may include in the acknowledgment message the pending page message. The RAN may then transmit the generated message to the WCD in a next available slot of the slot cycle associated with the WCD. By forgoing the transmission of separate page and registration acknowledgement messages on the paging channels, the amount of traffic on the paging channel attributable to that WCD may be reduced.

If, on the other hand, the determined amount of time is not less than the pre-determined threshold level, then the RAN may transmit the pending page message to the WCD at a next available slot in the slot cycle associated with the WCD. The threshold level is implemented to prevent substantial delays in page messages. For example, if a WCD is in the beginning of a twenty minute re-registration cycle, it may not make sense to delay the page message for and entire twenty minutes.

In an alternate embodiment, instead of including the pending page message in a registration acknowledgement message, the RAN may simply transmit the pending page message to the WCD responsive to receiving a re-registration request from the WCD. Instead of the Ran sending a registration acknowledgment message, the transmitted pending page message may itself serve as an implicit registration acknowledgement message. In this instance, the RAN may not transmit a separate registration acknowledgment message to the WCD. The WCD may make a determination whether the transmitted page message should be treated as an implicit registration acknowledgment message. For example, the WCD may determine whether an amount of time passing between transmitting the re-registration request and receiving the page message is less than a threshold value. If the amount of time is not less than the threshold value, the WCD may determine that the received page message should not be treated as an implicit registration acknowledgment message. Absent the reception of a separate registration acknowledgment message, the WCD may re-transmit the re-registration request message.

If, on the other hand, the amount of time is less than the threshold value, the WCD may determine that the RAN intends the page message to act as an implicit re-registration acknowledgment message. In this case, the WCD may not re-transmit the re-registration request to the RAN even though it does not receive a separate re-registration acknowledgment message from the RAN. The threshold amount of time may be, for example, between 0 and 2 seconds.

By providing the RAN with an ability to delay a pending page message in accordance with the foregoing, and allowing a WCD to treat a page message as a registration acknowledgment message, the number of messages required to be transferred over the paging channels can be reduced. By reducing the number of messages required to be transferred over the paging channels, more messages can be sent to WCDs in a shorter amount of time, improving responsiveness of the network and increasing user satisfaction with network performance.

These as well as other aspects, advantages, and alternatives will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention as claimed.

DETAILED DESCRIPTION

I. Structure of Communication System Including Radio Access Network

Figure 1:
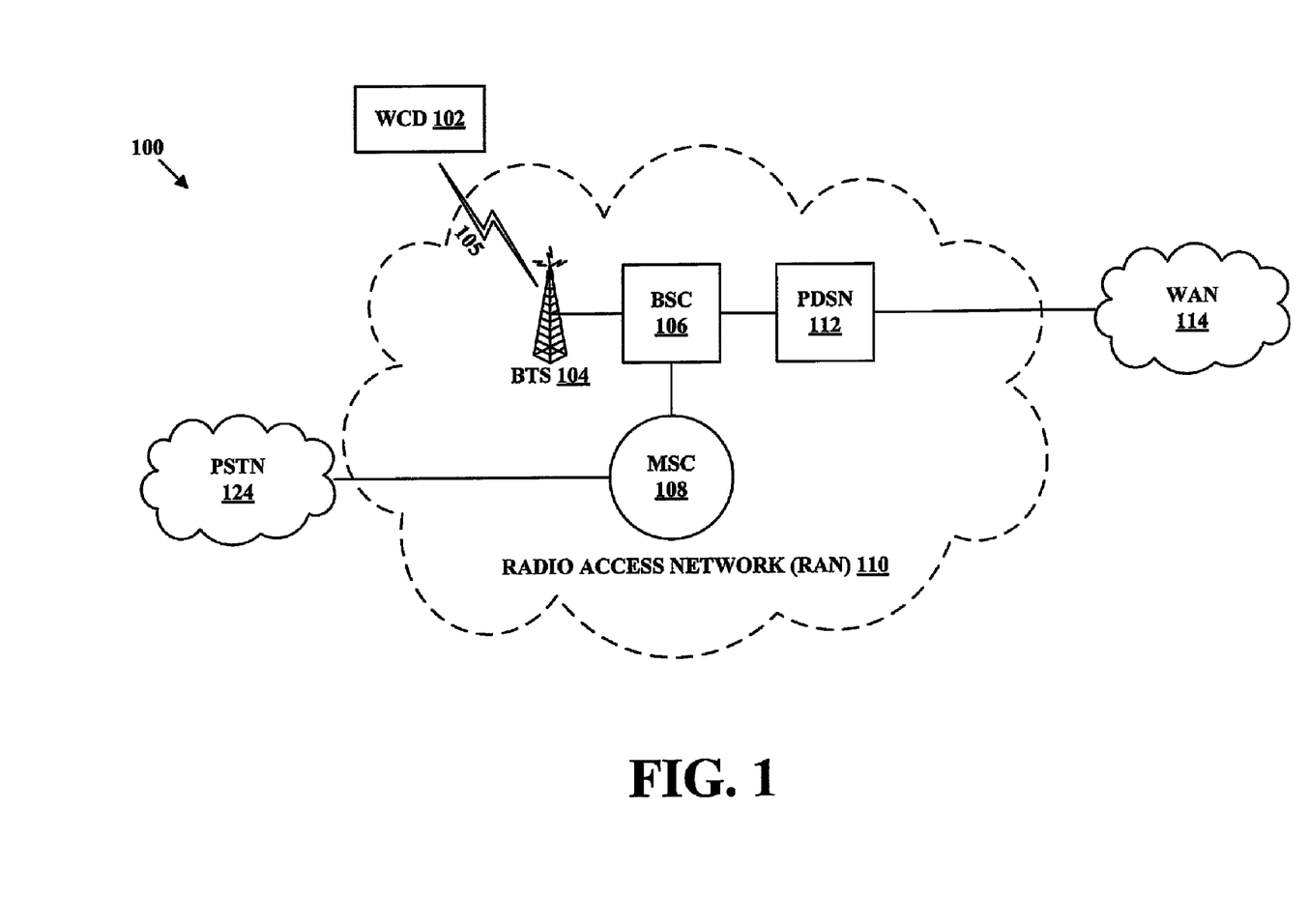
FIG. 1 is a block diagram of a communication system including a radio access network in which an exemplary embodiment can be implemented.

Referring to the drawings, FIG. 1 is a simplified block diagram depicting the arrangement of a communication system 100 including a radio access network (RAN) 110 in which an exemplary embodiment of the invention can be implemented. It should be understood, however, that these and other arrangements and processes shown and described herein are provided as examples only, and that many variations are possible. For instance, elements can be combined, distributed, omitted, added, or re-ordered. Further, the various logic functions described herein can be carried out by any combination of hardware, firmware and/or software, such as by one or more suitably programmed processors (e.g., one or more processors, data storage, and program instructions stored in the data storage and executable by the processor(s)), for instance.

As shown in FIG. 1, a communication system 100 may include a wireless communication device (WCD) 102, a RAN 110, a wide-area network (WAN) 114, and a public-switched telephone network (PSTN) 124. The RAN 110 may further comprise a base transceiver station (BTS) 104, a base station controller (BSC) 106, a packet data serving node (PDSN) 112, and a mobile switching center (MSC) 108. It should be understood that any number of network entities not shown in FIG. 1 could be present as well. As examples, there could be any number of WCDs and other devices in communication with BTS 104, PDSN 112, and PSTN 124. Furthermore, there could be any number of intermediate devices and networks making up all or part of any of the communication links between the entities of FIG. 1. For example, there could be one or more routers or other devices on the communication link between PDSN 112 and the WAN 114.

WCD 102 may be any mobile device capable of communicating with one or more base stations and/or one or more other mobile devices. WCD 102 may comprise one or more antennas that radiate to communicate with one or more other wireless devices or RANs. As an example, WCD 102 may communicate with base stations over a radio-frequency (RF) air interface using a protocol such as CDMA. WCD 102 may further comprise a processor and data storage comprising program instructions executable by the processor for carrying out the WCD functions described herein. As examples, the WCD 102 may be a cell phone, PDA, or laptop computer.

BTS 104 may be any base transceiver stations capable of communicating over an RF air interface with multiple WCDs using a protocol such as CDMA, or some other air interface protocol. BTS 104 may comprise one or more antennas that radiate to define respective coverage areas. BTS 104 may further comprise a communication interface for communicating with a BSC 106, as well as a processor and data storage comprising program instructions executable by the processor for carrying out the BTS functions described herein. BTS 104 may be communicatively coupled with BSC 106, and in turn with PDSN 112 and MSC 108.

BSC 106 may be any base station controller capable of communicating with one or more BTSs, as well as with one or more PDSNs, and one or more MSCs. BSC 106 may be communicatively coupled with at least BTS 104, PDSN 112, and MSC 108. BSC 106 may comprise a communication interface for communicating with the aforementioned devices, as well as a processor and data storage comprising program instructions executable by the processor for carrying out the BSC functions described herein.

Note that the term "base station" as used herein may refer to a particular BTS such as BTS 104. However, "base station" may also refer to a combination of a BTS and a BSC, such as the combination of BTS 104 and BSC 106. Furthermore, the arrangement of the BTS and BSC in FIG. 1 is exemplary in nature and is not meant to convey geographic relation. It should also be noted that more than one BTS could be controlled by a single BSC. Also, a given PDSN or MSC could communicate with more than one BSC. And other arrangements are possible as well.

PDSN 112 may be any networking device having a communication interface for communicating with BSC 106 and WAN 114, and may comprise a processor and data storage comprising program instructions executable by the processor for carrying out the PDSN functions described herein. PDSN 112 may function to provide packet-data connectivity between BSC 106 and WAN 114. PDSN 112 may include network-access-server functionality that enables WCDs, such as WCD 102, to send packet data to and receive packet data from WAN 114. As one example, PDSN 112 may be equipped to enable packet-based communication sessions such as Voice over IP (VoIP) sessions between WCD 102 and WAN 114.

MSC 108 may be any networking device having a communication interface for communicating with BSC 106 and PSTN 124, and may comprise a processor and data storage comprising program instructions executable by the processor for carrying out the MSC functions described herein. MSC 108 may function as a switching element, providing WCDs, such as WCD 102, with the ability to place and receive calls over PSTN 124 and place and receive calls with other WCDs being serviced by the same or different BTS. As an example, MSC 108 may function to enable voice calls between WCD 102 and PSTN 124. MSC 108 may also function to transmit page messages to WCDs, such as WCD 102, when an incoming call requests a connection with the WCD 102. For example, MSC 108 may carry out the later-described method 200 in connection with FIG. 2.

WAN 114 may be communicatively coupled with at least PDSN 112, as well as with one or more additional network entities, and may include one or more wide area networks, one or more local area networks, one or more public networks such as the Internet, and/or one or more private networks, each of which may be comprised of wired and/or wireless networks. Devices in communication with WAN 114 may exchange data using a packet-switched protocol such as the Internet Protocol (IP), and may be identified by an address such as an IP address. With this arrangement, a WCD 102 may be arranged to communicate with a remote computer through a communication path comprising air interface 105, BTS 104, BSC 106, PSDN 112, and WAN 114.

PSTN 124 may be communicatively coupled with at least MSC 108. With this arrangement, a WCD 102 may communicate in a voice call with a remote telephone device through a communication path comprising air interface 105, BTS 104, BSC 106, MSC 108 and PSTN 124.

II. Registration and Paging in the Communication System

In the communication system of FIG. 1, when WCD 102 powers on or otherwise enters the coverage area of RAN 110, the WCD 102 may first register with the RAN 110. To do so, the WCD 102 may send a registration message over an air interface access channel to the RAN 110, providing the RAN 110 with an identification of the WCD 102, such as a mobile identification number (MIN), electronic serial number (ESN), and/or other information. The RAN 110 may then authenticate and authorize the WCD 102, and obtain a copy of the WCD's service profile from a HLR (not shown) and store the profile in a VLR (not shown) in the manner set forth above.

When the WCD 102 first registers with the RAN 110, the WCD 102 and the RAN 110 may negotiate for use of a given slot cycle index. Thereafter, the RAN 110 may page the WCD 102 on a timeslot that the WCD 102 is set to check. For instance, if the WCD 102 is operating at slot cycle index 0, then the BTS 106 may page the WCD 102 in a timeslot that is some multiple of 1.28 seconds from time t=0, whereas if the WCD 102 is operating at slot cycle index 2, then the BTS 106 may page the WCD in a timeslot that is some multiple of 5.12 seconds from time t=0.

Once the WCD 102 is registered, the WCD 102 may then originate outgoing communications via the RAN 110 and receive incoming communications via the RAN 110. For instance, the WCD 102 may place a call via PSTN 124 to a remote telephone, and the WCD 102 may receive a call via PSTN 124 from a remote telephone. Further, the WCD 102 may acquire an IP address for communication on the packet-switched WAN 114 and use that IP address to exchange packet-data with a remote computer or other node.

To originate a call over the PSTN 124, the WCD 102 may send an origination message over an air interface access channel to the RAN 110, providing dialed digits indicative of the called party. In the communication system of FIG. 1 for instance, the origination message may pass to the MSC 108, and the MSC 108 may responsively set up the call over the PSTN 124 to the called party. Further, the MSC 108 may instruct the BSC 106 to assign an air interface traffic channel for use by the WCD 102, and the BSC 106 may do so.

On the other hand, when a call for the WCD 102 comes in to the RAN 110 from the PSTN 124, the RAN 110 may page the WCD 102 over an air interface paging channel, so as to alert the WCD 102 of the incoming call. For instance, the MSC 108 may receive a call request from the PSTN 124 and may responsively direct the BSC 106 to page the WCD 102, and the BSC 106 may responsively send a page message over the paging channel for receipt by the WCD 102. An exemplary page message may carry an identifier of the WCD 102, such as a MIN, so that the WCD 102 can determine that the page message is intended for the WCD 102. Further, the page message could direct the WCD 102 to use a particular air interface traffic channel when answering the call. The page message could take various other forms as well.

Upon receipt of the page message, the WCD 102 may then answer the call (e.g., when a user presses a "TALK" button) by sending a page response to the RAN 110 over an air interface access channel. The page response can take various forms. Upon receipt of the page response message, the RAN 110 may then connect the call over the assigned traffic channel to the WCD 102.

To engage in packet-data communication, on the other hand, the WCD 102 may first acquire both a radio link (i.e., traffic channel) via air interface 105 and a data link via PDSN 112. To do this, the WCD 102 may send an origination message to the RAN 110, including in the origination message a packet-data service option code. Upon receipt of the origination message bearing that service option code, the MSC 108 may then instruct the BSC 106 to process the origination, and the BSC 106 may responsively assign a traffic channel for use by the WCD 102 and may signal to the PDSN 112 to facilitate setup of packet-data connectivity. The PDSN 112 and WCD 102 may then negotiate to establish a data link layer connection, such as a point-to-point protocol (PPP) session for instance, and the PDSN 112 or other network entity may assign an IP address for the WCD 102 to use on WAN 114.

Once the WCD 102 acquires packet-data connectivity, the WCD 102 may then send and receive packet-data via the PDSN 112 and the WAN 114. For instance, the WCD 102 may exchange packet-data with a remote computer on the WAN 114.

When a WCD 102 has a radio link and a data link, the WCD 102 is considered to be in an "active" state. After a certain period of time during which no packet-data flows to or from the WCD 102, however, the BSC 106 may release the traffic channel that had been assigned to the WCD 102, which would put the WCD 102 in a "dormant" state.

When the WCD 102 is in the dormant state, if another entity on the WAN 114 seeks to send packet-data to the IP address of the WCD 102, the packet-data would arrive at the PDSN 112 and flow to the BSC 106. Because the WCD 102 would lack a radio link over which the BSC 106 could send the incoming packet-data, the BSC 106 may then page the WCD 102 over a paging channel, and the WCD 102 may send a page response to the RAN 110 over an access channel. The BSC 106 may then assign a traffic channel for use by the WCD 102, and the BSC 106 may send the packet-data to the WCD 102 over that traffic channel.

As noted above, the number of paging channels over which the BTS 106 may transmit control, call set-up, and paging messages to WCDs, including WCD 102, are limited. For example, the BTS 104 may have available up to seven paging channels over which to send orders and messages.

III. Method of Reducing Paging Channel Traffic in the Communication System

Given the limited number of paging channels and time slots available to a particular BTS, it would be advantageous to reduce the amount of traffic sent over the paging channels. Reducing the amount of traffic over the paging channels could improve RAN 110 responsiveness to requests from WCDs it serves, increasing user satisfaction with network performance.

The devices and methods disclosed may reduce the amount of traffic that the RAN 110 sends over the paging channels. For example, traffic may be reduced by delaying transmission of a pending page message to the WCD 102 if a time remaining in a re-registration interval associated with the WCD 102 is less than a threshold value. If the time remaining is less than a threshold value, the pending page message may, for example, be sent from the RAN 110 to the WCD 102 in a registration acknowledgement message, or the pending page message may be sent as the registration acknowledgment message. In one embodiment, the WCD 102 may be configured to treat a page message received within a threshold amount of time after sending a re-registration request as an implicit registration acknowledgment.

Figure 2:
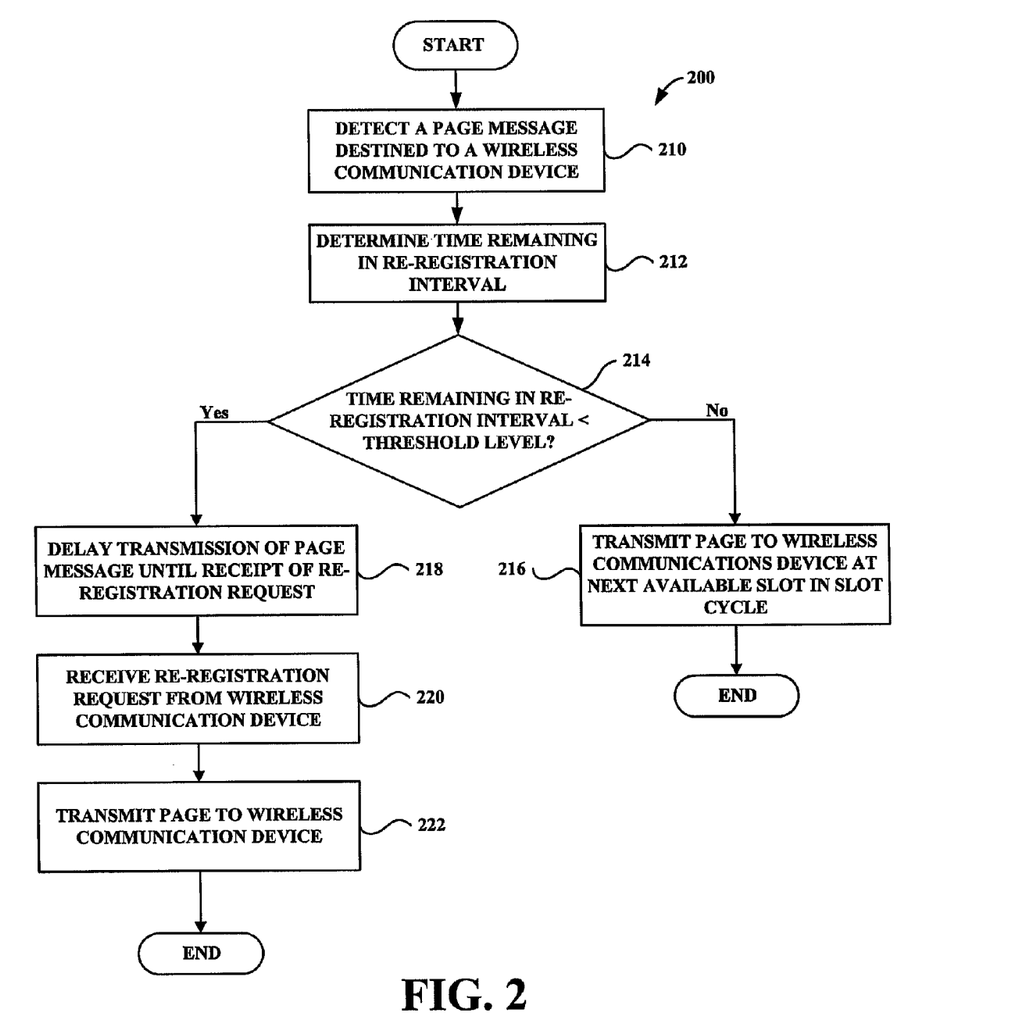
FIG. 2 is a flow chart depicting functions carried out by the RAN in accordance with an exemplary embodiment.

FIG. 2 is a flowchart of an exemplary method that that the RAN 110 of FIG. 1 may make use of, in accordance with an exemplary embodiment. As shown in FIG. 2, a method 200 begins at step 210, when logic in the RAN 110 detects a page message destined for WCD 102. The page message may be generated due to an incoming phone call via PSTN 124, due to an incoming data link via PDSN 112, or any other instance in which a connection to WCD 102 is desired. The page could be detected in the RAN 110, for example, at the MSC 108, at the BSC 106, or at some other element in the RAN 110.

Responsive to detecting the page message at step 210, the RAN 110 may determine a time remaining in a re-registration interval associated with the WCD 102 at step 212. As set forth above, a re-registration interval may be associated with the WCD 102 when the WCD 102 registers with the RAN 110, and may be communicated to the WCD 102 during the registration process. The associated re-registration interval may be a fixed interval applied to all WCDs that register with the RAN 110, or may vary based on time of day, amount of traffic, or some other parameter, including a random parameter that varies re-registration intervals across WCDs.

The RAN 110 may keep track of an amount of time remaining in the corresponding re-registration interval for each WCD registered with it. In the event that the re-registration interval passes without the RAN 110 receiving a re-registration request from the associated WCD 102, the RAN 110 may assume that the WCD 102 has left the service area or powered-off, and unload the profile associated with the WCD 102. After the profile is unloaded, further communications from the WCD 102 may be rejected without the WCD 102 again registering with the RAN 110.

At step 214, the RAN 110 may compare the amount of time remaining in the re-registration interval associated with the WCD 102 with a threshold level amount of time remaining. The threshold amount of time remaining could be a fixed amount of time or a variable amount of time. For example, the threshold value could vary depending on a time of day, geographic area, an amount of traffic in the RAN 110, or some other parameter. The threshold value could be, for example, more than 0 seconds to less than 60 seconds. More preferably, the threshold value is between 0 and 20 seconds.

If the determination is made at step 214 that the time remaining in the re-registration interval is not less than the threshold level, flow proceeds to step 216 where the RAN 110 may transmit the pending page to the WCD 102 at a next available slot in the slot cycle associated with the WCD 102. For example, if the slot cycle index associated with the WCD 102 is 2, and the next slot in the slot cycle is available, the RAN 110 may transmit the pending page to the WCD 102 within the next 5.12 seconds. Of course, other slot cycle indices may result in different timings.

On the other hand, if the determination is made at step 214 that the time remaining in the re-registration interval is less than the threshold level, flow proceeds to step 218 where the RAN 110 may delay transmission of the page message until it receives a re-registration request from the WCD 102. The page could be delayed at any one of the MSC 108, the PDSN 112, or the BSC 106. Other entities in the RAN 110 could also temporarily hold the pending page without departing from the scope of this disclosure. Of course, it is possible that the WCD 102 to which the page is directed has powered-off or left the geographic area associated with the RAN 110, and no re-registration request will be received by the RAN 110 in the re-registration period. In such a case, the RAN 110 may be configured to dispose of the pending page message and/or send a failure message to the source of the page message once the re-registration period has expired and no re-registration request has been received.

Under normal circumstances, however, the WCD 102 to which the pending page is directed will send a re-registration request to the RAN 110 within the re-registration period. Subsequent to receipt of the re-registration request, the RAN 110 may then transmit the pending page to the WCD 102 over a paging channel. The pending page could be transmitted to the WCD 102 in a registration acknowledgment message, for example, or could be transmitted to the WCD 102 as an implicit registration acknowledgement, without any further transmission of a registration acknowledgment message by the RAN 110. By delaying the pending page until a re-registration request is received from the WCD 102, and sending the pending page to the WCD 102 in a registration acknowledgment message or as the registration acknowledgment message itself, the amount of traffic sent over the paging channels per WCD may be reduced, as two separate messages are no longer transmitted over the paging channels. Additionally, by waiting for the WCD 102 to re-register with the RAN 110, the RAN 110 can be assured that the WCD 102 is still active and within communication range of the RAN 110 to receive the page, thereby avoiding the transmission of a paging message over the air interface 105 when in fact the WCD 102 can not receive it. As a result, improved responsiveness of the network may be achieved.

Figure 3:
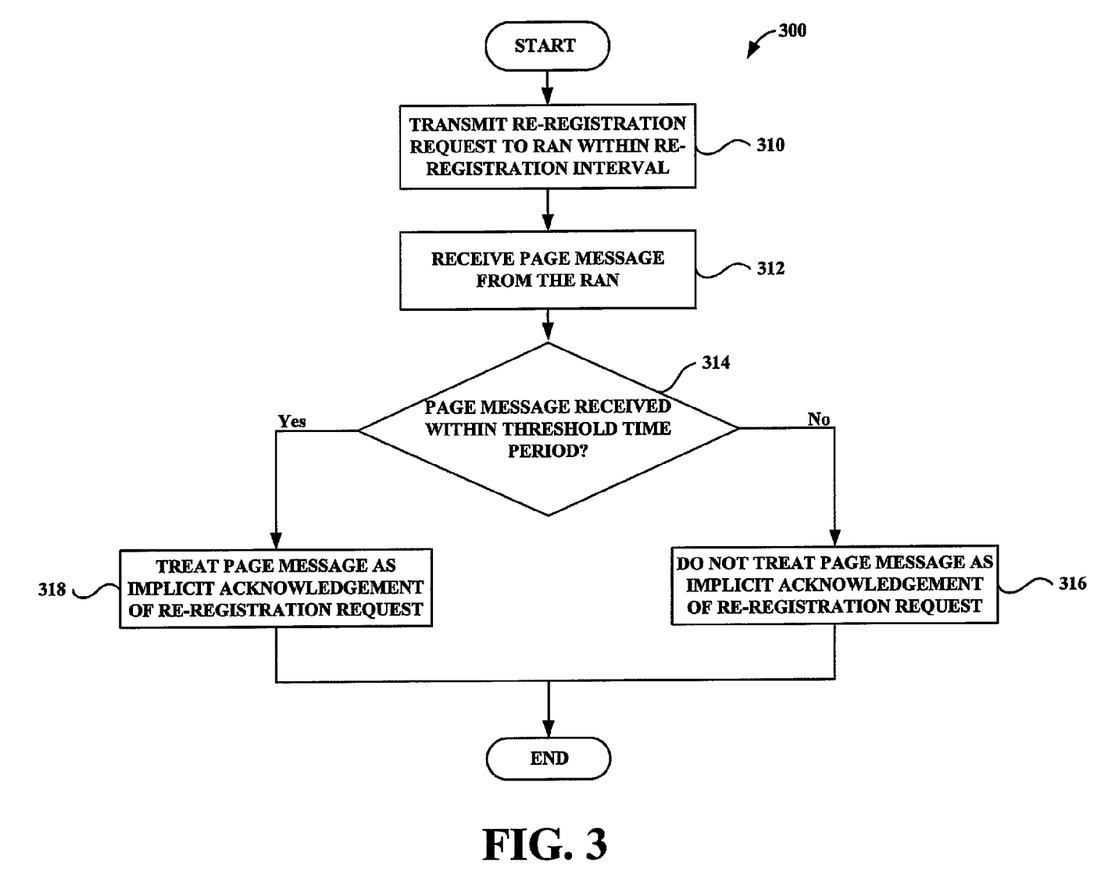
FIG. 3 is a flow chart depicting functions carried out by a wireless communications device in accordance with an exemplary embodiment.

In a further aspect, an exemplary method may be performed by the WCD 102 in order to aid in the reduction of paging traffic per WCD in the communication system 100 of FIG. 1. FIG. 3 is a flowchart of an exemplary method that the WCD 102 of FIG. 1 may make use of, in accordance with an exemplary embodiment. As shown in FIG. 3, a method 300 begins at step 310, when logic in the WCD 102 detects an approaching end in the re-registration interval associated with the WCD 102. At this point, the WCD 102 may transmit a re-registration request to the RAN 110 on an access channel of the air interface 105. Once the re-registration request is received by the RAN 110, the RAN 110 may transmit any pending page messages to the WCD 102 in a registration acknowledgment message, or may transmit any pending page messages to the WCD 102 as an implicit registration acknowledgment.

In the latter case, the WCD 102 may be configured to determine whether a page message received from the RAN 110 should be treated as an implicit acknowledgment of the re-registration request. In step 312, the WCD 102 receives a page message from the RAN 110 after transmitting the re-registration request to the RAN 110. At step 314, the WCD 102 determines whether the page message should be treated as an implicit acknowledgment of the re-registration request. The WCD 102 may make the determination by comparing the amount of time that has passed between the WCD 102 transmitting the re-registration request in step 310 and the WCD 102 receiving the page message in step 312 to a threshold amount of time.

As set forth in step 316, if the page message is not received within a threshold period of time after transmitting the re-registration request, the WCD 102 may not treat the page message as an acknowledgment of the re-registration request, and the WCD 102 may expect to receive a separate registration acknowledgment from the RAN 110. In the event no acknowledgment is received within a set amount of time, the WCD 102 may re-transmit the re-registration request to the RAN 110.

As set forth in step 318, if the page message is received by the WCD 102 within a threshold period of time after transmitting the re-registration request, the WCD 102 may treat the page message as an implicit acknowledgment of the re-registration request. In the event that a separate registration acknowledgment is subsequently received by the WCD 102, the WCD 102 may simply discard or ignore the acknowledgment.

The threshold value used by the WCD 102 to determine whether the page message should be treated as an implicit acknowledgement of the re-registration request may be, for example, a value greater than 0 seconds but less than 5 seconds. More preferably, the threshold value is between 0 and 2 seconds.

In this manner, and when supported by the WCD 102, the RAN 110 does not need to separately transmit a registration acknowledgement message, or incur the overhead of including the page message in a registration acknowledgment message, reducing required traffic on the paging channels per WCD.

IV. Exemplary Logic for Carrying Out the Method of Reducing Paging Channel Traffic a. Exemplary RAN Logic Entity

In accordance with the exemplary embodiment, one or more component(s) of the RAN 110 could carry out the function of detecting a page message and delaying transmission of the page message in accordance with an outstanding re-registration interval of an associated WCD 102. Which component(s) carry out the function can depend on which component(s) decide to page a WCD 102. Further, the decision could be made in some instances by one component and in other instances by another component, if appropriate. Additionally, one component may detect the page message, and another component may delay the page message.

For instance, the MSC 108 may be the RAN 110 entity that detects a page message and decides when to page the WCD 102. Alternately, the BSC 106 may be the RAN 110 entity that detects a page message and decides when to page the WCD 102. Still alternatively, some other entity, or some combination of entities including the MSC 108 and BSC 106, could detect a page message and decide when to page the WCD 102.

The re-registration cycle and threshold values associated with a given WCD 102 may be hard-coded values selected and applied by the RAN 110. As an alternative, the re-registration cycle and/or threshold values for a given WCD 102 could be set in advance for, and associated with, particular WCDs. For instance the WCD service profile stored in the HLR and VLR could specify the re-registration cycle and threshold value to be used for each WCD 102. Thus, for example, a logic entity in the RAN 110 such as the MSC 108 could refer to the slot re-registration interval indicated by that service profile when assigning a re-registration interval to a registering WCD 102 and cause the interval to be transmitted to the WCD 102. Similarly, the MSC 108 could refer to the threshold value indicated by that service profile when determining whether to delay a transmission of a page message to the WCD 102.

Figure 4:
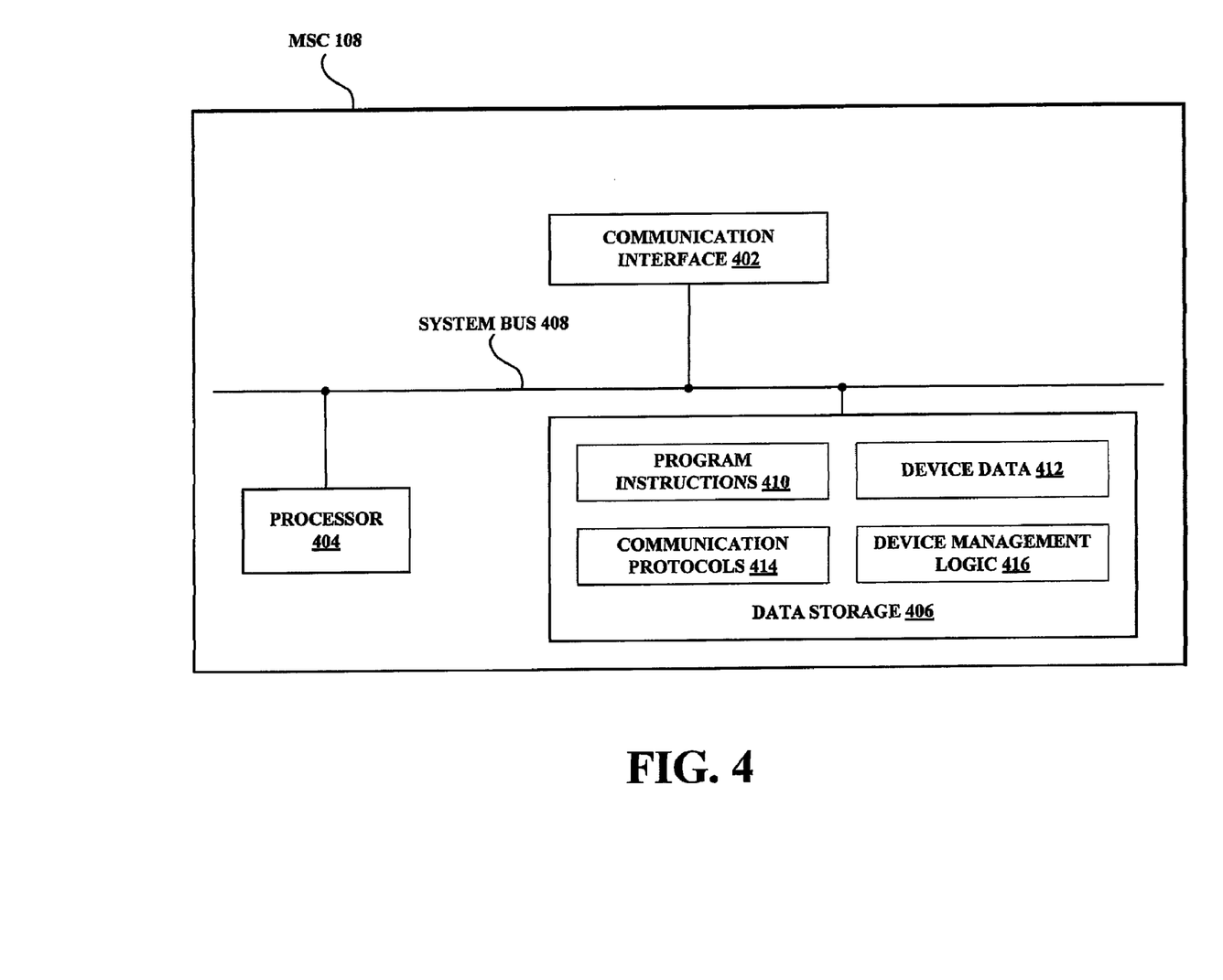
FIG. 4 is a block diagram of an exemplary mobile switching center that may be used in accordance with an exemplary embodiment.

FIG. 4 is a functional block diagram depicting a logical RAN component arranged to carry out the exemplary embodiment. The logical component could reside in a BSC 106 and/or MSC 108 for instance. For ease of reference, FIG. 4 is illustrated as an MSC 108. FIG. 4 illustrates that an MSC 108 may include a communication interface 402, a processor 404, and data storage 406, all of which may be communicatively linked by a system bus 408.

Communication interface 402 may be a combination of hardware and software enabling MSC 108 to communicate with BSC 104, PSTN 124, and possibly one or more other entities. As such, communication interface 402 may include an interface for packet-switched communication and another for circuit-switched communication. Communication interface 402 may include an Ethernet card and may, instead or in addition, include a wireless-communication interface, which may enable it to communicate wirelessly with one or more devices or networks.

Processor 404 may comprise multiple (e.g., parallel) processors, such as a general purpose microprocessor and/or a discrete digital signal processor. Data storage 406 may take various forms, in one or more parts, such as a non-volatile storage block and/or a removable storage medium.

Data storage 406 may store program instructions 410, device data 412, communication protocols 414, and device management logic 416. Program instructions 410 may be executable by processor 404 to carry out various functions described herein. Device data 412 may include any type of data related to those functions and may include, for example, re-registration intervals and threshold values associated with WCDs 102.

Communication protocols 414 may be useful to receive data from and send data to one or more network entities, and may include any suitable protocols. Compatible protocols may be stored in other entities in communication with MSC 108. Device management logic 416 may be used to manage aspects of MSC 108 such as memory and file access.

b. Exemplary WCD

Figure 5:
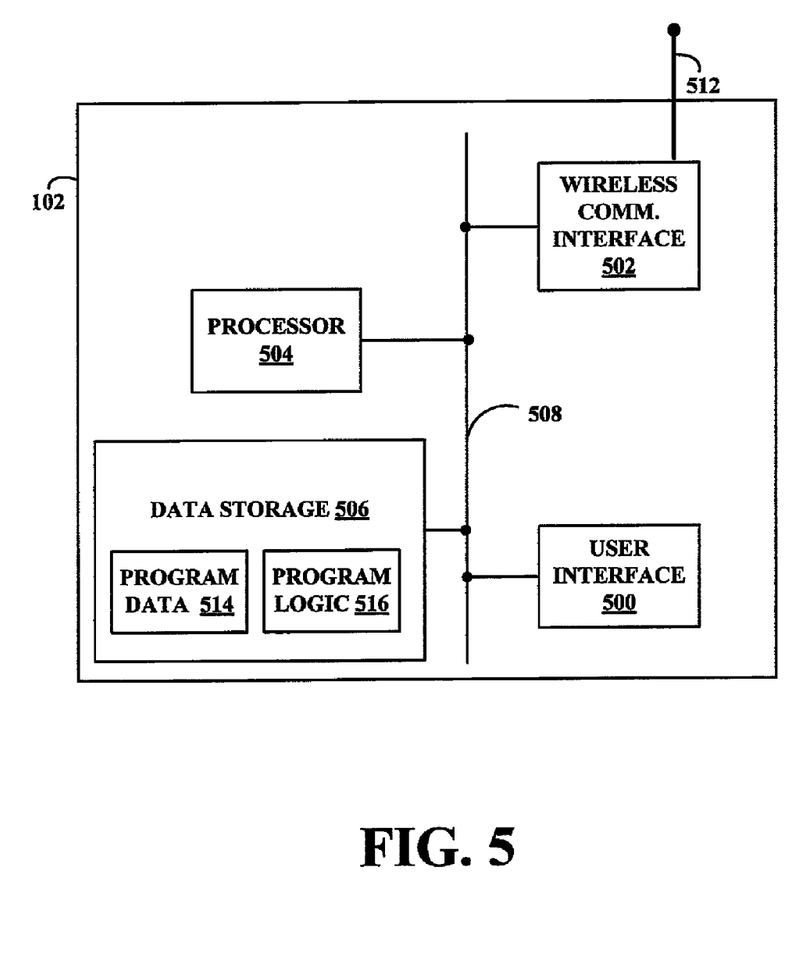
FIG. 5 is a block diagram of a WCD that may operate in the communication system according to an exemplary embodiment.

FIG. 5 is a functional block diagram depicting an exemplary WCD 102 arranged to carry out the exemplary embodiment.

As shown in FIG. 5, the exemplary WCD 102 may include a user interface 500, a wireless communication interface 502, a processor 504, and data storage 506, all linked together via a system bus, network, or other connection mechanism 508. An internal or external antenna 512 may be provided to aid in wireless communications with other devices. The WCD 102 may also include other elements.

The user interface 500 preferably functions to facilitate user interaction with the exemplary WCD 102. The user interface 500 may include a variety of input components, such as a touch screen, a navigation pad, a multi-functional button, a thumb wheel, a keyboard or keypad, and/or a microphone for instance. Additionally, the user interface 500 may include a variety of output components, such as a display screen and/or a speaker for instance. The user interface 500 may include signal processing components, such as A-D and D-A circuitry and other components for facilitating user interaction with the exemplary WCD 102 as well.

The communication interface 502 preferably functions to communicatively couple the WCD 102 to the RAN 110, and more particularly, to the BTS 104. In this respect, the communication interface 502 will preferably facilitate forward-link and reverse-link communication with the BTS 104. Further, the communication interface 502 will preferably support multiple channels on the forward-link and reverse-link, including a first reverse-link channel (e.g., a DRC channel) and a second-reverse link channel (e.g., a DSC channel).

The communication interface 502 may take the form of a chipset adapted to facilitate wireless communication according to a desired protocol (e.g., EVDO, WiMax) and/or any other form that provides for wireless communication. The communication interface 502 may also include multiple communication interfaces, such as one with which the exemplary WCD 102 sends reverse-link communications and one with which the exemplary WCD 102 receives forward-link communications. Other configurations are also possible.

The processor 504 may comprise one or more general purpose microprocessors and/or dedicated signal processors. (The term "processor" encompasses either a single processor or multiple processors that could work in combination.) Data storage 506, in turn, may comprise any computer readable medium, including memory and/or other storage components, such as optical, magnetic, organic or other memory or disk/disc storage, which can be volatile and/or non-volatile, internal and/or external, and integrated in whole or in part with the processor 504. Data storage 506 preferably contains or is arranged to contain (i) program data 514 and (ii) program logic 516. Although these components are described herein as separate data storage elements, the elements could just as well be physically integrated together or distributed in various other ways. In one example, the program data 514 may be maintained in data storage 506 separate from the program logic 516, for easy updating and reference by the program logic 516. Additionally, the data storage 506, including any portion of program data 514 and/or program logic 516, may be stored in a removable computer readable medium that is detachable from the WCD 102 and/or bus 508.

Program data 514 may contain, for example, information related to the re-registration interval indicating a time period in which the WCD 102 should re-register with the RAN 110. As set forth above, the re-registration interval may be communicated to the WCD 102 upon registration with the RAN 110. The WCD 102 may then store the value in program data 514. As another example, program data 514 may contain an indication of a threshold value that determines a maximum amount of time that may pass between the WCD 102 transmitting a re-registration request to the RAN 110 and the RAN 110 transmitting a page message to the WCD 102 for the WCD 102 to treat the page message as an implicit registration acknowledgment message. This threshold value could be a hardcoded value stored in static, non-volatile read-only memory, or could be an updatable value that is modifiable by a user and/or by the RAN 110. The threshold value could be stored elsewhere, for example, in a data store separate from the program data 514 and program logic 516. The threshold value could be, for example, a value greater than 0 seconds but less than 5 seconds. More preferably, the threshold value is between 0 and 2 seconds.

Program logic 516 preferably comprises machine-language instructions that may be executed or interpreted by processor 504 to carry out functions in accordance with the exemplary method described with regard to FIG. 3, and elsewhere herein. Additionally, program logic 516 comprises machine-language instructions for initiating and managing data and voice communications with other devices, among other functions.

V. Conclusion

As noted above, by allowing the RAN to delay a pending page message in accordance with the foregoing, and allowing a WCD to treat a page message as a registration acknowledgment message, traffic on the paging channels in the RAN per WCD can be reduced. As a result, improved network responsiveness can be provided.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method comprising:
responsive to detecting a page message destined to a wireless communication device (WCD), a radio access network (RAN) determining an amount of time remaining in a re-registration interval associated with the WCD;
if the determined amount of time is less than a pre-determined threshold level, then the RAN delaying transmission of the pending page message to the WCD until after a re-registration request is received from the WCD, and if the determined amount of time is not less than the pre-determined threshold level, then the RAN transmitting the pending page message to the WCD at a next available slot in a periodically recurring slot cycle associated with the WCD.

2. The method of claim 1, further comprising the RAN associating the re-registration interval with the WCD by assigning the re-registration interval to the WCD and transmitting the re-registration interval to the WCD.

3. The method of claim 2, wherein transmitting the re-registration interval to the WCD comprises including the re-registration interval in an initial registration response message transmitted to the WCD.

4. The method of claim 1, further comprising, if the determined amount of time remaining in the re-registration interval associated with the WCD is less than the pre-determined threshold level:
the RAN receiving a re-registration message from the WCD within the time remaining in the re-registration interval;
the RAN generating a registration acknowledgment message in response to the received re-registration message, the registration acknowledgment message including the pending page message, and
the RAN transmitting the generated message to the WCD in a next available slot of the slot cycle associated with the WCD.

5. The method of claim 1, further comprising, if the determined amount of time remaining in the re-registration interval associated with the WCD is less than the pre-determined threshold level:
the RAN receiving a re-registration message from the WCD within the time remaining in the re-registration interval;
in response to receiving the re-registration message, the RAN transmitting the pending page message in a next available slot cycle associated with the WCD, the pending page message acting as a registration acknowledgement message, and the RAN not transmitting a separate registration acknowledgment message to the WCD responsive to receiving the re-registration message.

6. The method of claim 1, wherein the re-registration interval is between 10 minutes and 1 hour.

7. The method of claim 1, wherein the pre-determined threshold level is between 0 and 20 seconds.

8. A radio access network (RAN) for providing service to a wireless communications device (WCD), the RAN comprising:
a controller having a processor, the processor being configured to:
(i) in response to detecting a page message destined to the WCD, determine an amount of time remaining in a re-registration interval associated with the WCD;
(ii) if the determined amount of time is less than a pre-determined threshold level, delay transmission of the pending page message to the WCD until after a re-registration request is received from the WCD, and
(iii) if the determined amount of time is not less than the pre-determined threshold level, transmit the pending page message to the WCD at a next available slot in a periodically recurring slot cycle associated with the WCD.

9. The RAN of claim 8, wherein the processor is further configured to associate the re-registration interval with the WCD by assigning the re-registration interval to the WCD and causing the re-registration interval to be transmitted to the WCD via a base transceiver station (BTS).

10. The RAN of claim 9, wherein the processor causing the re-registration interval to be transmitted to the WCD comprises including the re-registration interval in an initial registration response message transmitted to the WCD.

11. The RAN of claim 8, wherein the processor is further configured, if the determined amount of time remaining in the re-registration interval associated with the WCD is less than the pre-determined threshold level, to:
  receive a re-registration message from the WCD within the re-registration interval; and
  generate a registration acknowledgment message in response to the received re-registration message, the registration acknowledgment message including the pending page message, and
  cause the registration acknowledgment message to be transmitted to the WCD in a next available slot of the slot cycle associated with the WCD.

12. The RAN of claim 8, wherein the processor is further configured, if the determined amount of time remaining in the re-registration interval associated with the WCD is less than the pre-determined threshold level, to:
  receive a re-registration message from the WCD within the re-registration interval; and
  in response to receiving the re-registration message, cause the pending page message to be transmitted to the WCD in a next available slot of the slot cycle associated with the WCD, the pending page message acting as a registration acknowledgement message, and the RAN not transmitting a separate registration acknowledgment message to the WCD responsive to receiving the re-registration message.

13. The RAN of claim 8, wherein the re-registration interval is between 10 minutes and 1 hour.

14. The RAN of claim 8, wherein the pre-determined threshold level is between 0 and 20 seconds.

15. The RAN of claim 8, wherein the controller is a mobile switching center (MSC).

* * * * *